US007632025B2

(12) United States Patent
Sung et al.

(10) Patent No.: US 7,632,025 B2
(45) Date of Patent: Dec. 15, 2009

(54) MOBILE COMMUNICATION TERMINAL HAVING ROTATABLE CAMERA

(75) Inventors: Young-Hwan Sung, Gyeonggi-Do (KR); Hee-Yong Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 316 days.

(21) Appl. No.: 11/457,456

(22) Filed: Jul. 13, 2006

(65) Prior Publication Data

US 2007/0013555 A1    Jan. 18, 2007

(30) Foreign Application Priority Data

Jul. 15, 2005    (KR) ...................... 10-2005-0064480

(51) Int. Cl.
*G03B 17/00* (2006.01)
(52) U.S. Cl. ................... 396/428; 396/429; 348/207.99
(58) Field of Classification Search ................. 396/428, 396/73, 429; 348/207.99, 335; 455/556.1
See application file for complete search history.

(56) References Cited

U.S. PATENT DOCUMENTS

| 6,559,881 | B1 | 5/2003 | Vooi-Kia |
| 2004/0009790 | A1* | 1/2004 | Im ........................... 455/556.1 |
| 2004/0189851 | A1 | 9/2004 | Son |
| 2005/0220451 | A1* | 10/2005 | Cho et al. ................... 396/349 |
| 2007/0070189 | A1* | 3/2007 | Lee .......................... 348/14.16 |

FOREIGN PATENT DOCUMENTS

| CN | 1490663 | 4/2004 |
| EP | 1 381 207 A2 | 1/2004 |
| EP | 1 469 672 A1 | 4/2004 |
| EP | 1 553 749 A1 | 7/2005 |
| EP | 1553749 A1 * | 7/2005 |
| EP | 1 689 181 A1 | 8/2006 |
| JP | 2002-112081 | 4/2002 |
| JP | 2003-189142 | 7/2003 |
| JP | 2003-264619 | 9/2003 |
| JP | 2004-146990 | 5/2004 |
| JP | 2004-242202 | 8/2004 |
| JP | 2005-051431 | 2/2005 |
| JP | 2005-086390 | 3/2005 |
| JP | 2005-164622 | 6/2005 |
| KR | 20-0326816 | 9/2003 |
| WO | WO 2005-048599 A1 | 5/2005 |

* cited by examiner

*Primary Examiner*—Melissa J. Koval
*Assistant Examiner*—Autumn Parker
(74) *Attorney, Agent, or Firm*—Lee, Hong, Degerman, Kang & Waimey

(57) ABSTRACT

A mobile communication terminal is provided that includes a terminal body and a camera assembly mounted in the terminal body, wherein the camera assembly includes a camera, a driving unit for generating driving power for rotating the camera, and a housing assembled as one body at the terminal body by rotatably supporting the camera and fixing the driving unit. The camera and the driving unit can be stably supported within the housing and can be easily mounted therein.

15 Claims, 8 Drawing Sheets

MOBILE COMMUNICATION TERMINAL HAVING ROTATABLE CAMERA

CROSS-REFERENCE TO RELATED APPLICATIONS

Pursuant to 35 U.S.C. §119(a), this application claims the benefit of earlier filing date and right of priority to Korean Application No. 64480/2005, filed on Jul. 15, 2005 the content of which is hereby incorporated by reference herein in its entirety.

FIELD OF THE INVENTION

The present invention relates to a mobile communication terminal and, more particularly, to a mobile communication terminal having a rotatable camera.

DESCRIPTION OF THE RELATED ART

A mobile communication terminal, such as a mobile phone and a PDA, is a mobile electronic device that allows a user to transmit, receive, read and/or process information while traveling. Recently, mobile communication terminals have been equipped with a digital camera for capturing images or video in addition to a mobile communication function such that users can personally create and process multimedia through the mobile communication terminal.

FIG. 1 illustrates a perspective view of a related art mobile communication terminal 1. The mobile communication terminal 1 includes main body 10 and a folder 20 connected to the main body in a foldable manner. A keypad 11 for entering a control signal and a microphone 12 are provided on a front surface of the main body 10 and a display 21 for outputting visual information and a speaker 22 for outputting a voice signal are installed on an inner surface of the folder 20.

An upper end of the main body 10 and a lower end of the folder 20 are connected by a hinge 30 such that the mobile communication terminal 1 is foldable. The hinge 30 includes a pair of lower hinges 31, 32 extending from both sides of the upper end of the main body 10 and an upper hinge 33 extending from the lower end of the folder 20 such that the upper hinge is positioned between the lower hinges.

A camera 40 is installed at one side of the lower hinge 31 and is rotatable independent of the hinge 30 rotation. The camera 40 includes a handle 41 on its outer circumference and a camera lens 42, the direction of which a user can control by holding and manipulating the handle 41.

Since a user must manually turn the handle 41 of the related art mobile communication terminal 1, the camera lens 42 can be easily contaminated. Additionally, because various directions and magnitude of forces can be applied to turn the camera 40, a gap may be generated at the portion of the lower hinge 31 that supports the camera thereby resulting in the camera being shaken or broken during use. Moreover, manual operation of the camera 40 increases user inconvenience.

SUMMARY OF THE INVENTION

One object of the present invention is to provide a mobile communication terminal with a camera that can be stably rotated and easily assembled. Another object of the present invention is to prevent components of a mobile communication terminal camera from being abraded or shaken when the camera is rotated. Still another object of the present invention is to prevent a gap from being generated due to movement of a component, such as a flexible PCB, for connecting a camera of a mobile communication terminal when the camera is rotated.

In one aspect of the present invention, a mobile communication terminal is provided. The mobile communication includes a terminal body and a camera assembly mounted in the terminal body, wherein the camera assembly includes a camera, a driving unit adapted to generate power for rotating the camera within the camera assembly and a housing adapted to rotatably support the camera such that the camera and the driving unit are assembled as a single body that engages the terminal body.

It is contemplated that the camera is installed such that it is rotatable to face either a front or rear side of the terminal body. It is further contemplated that the camera is adapted to rotate according to manipulation of a button installed on the terminal body.

It is contemplated that the housing includes a first receiving portion adapted to provide a rotation space for the camera and a second receiving portion adapted to receive the driving unit. It is further contemplated that the first receiving portion includes openings in both forward and rearward directions, the openings adapted to allow a lens of the camera to be exposed according to a rotational position of the camera.

It is contemplated that the terminal further includes first and second shaft supports formed at opposite ends of the first receiving portion and adapted to rotatably support first and second shafts formed at opposite sides of the camera. It is further contemplated that the second receiving portion is connected to the first receiving portion.

It is contemplated that the terminal further includes a connection recess formed at an end of the first shaft of the camera and to which a rotational shaft of the driving unit is connected. It is further contemplated that the terminal further includes an abrasion-preventing member installed between the connection recess and the rotational shaft of the driving unit and adapted to prevent the connection recess from being abraded.

It is contemplated that the terminal further includes a rotation-limiting part formed between the first shaft of the camera and the driving unit and adapted to rotate the camera at a certain rotation angle. It is further contemplated that the rotation-limiting part includes a rail recess formed as a groove in a circular arc shape on the first shaft and a stop protrusion formed at the housing and adapted to engage opposite ends of the rail recess.

It is contemplated that the terminal further includes buffering members formed at opposite ends of the rail recess and adapted to buffer an impact applied by the stop protrusion. It is further contemplated that the terminal further includes a flexible printed circuit board (PCB) provided at the second shaft and connecting the camera to a circuit board installed at the terminal body, the flexible PCB adapted to be wound or unwound when the camera is rotated.

It is contemplated that the terminal further includes a winding-limiting part formed at the second shaft and adapted to prevent an inner portion of the flexible PCB from being wound. It is further contemplated that the winding-limiting Part includes a winding shaft adapted to allow an inner ring portion of the flexible PCB to be fixedly inserted in a loop state with a certain length and a fixing protrusion disposed at one side of the winding shaft such that a narrow gap is formed between the winding-limiting part and fixing protrusion. Preferably, the driving unit includes a motor.

In another aspect of the present invention, a mobile communication terminal is provided. The mobile communication includes a first body, a second body Connected at a rear side of the first body such that the first body may be slidably moved relative to the second body and a camera assembly mounted on one of the first body and second body, wherein the camera assembly includes a camera, Openings adapted to expose the camera in both front and rear directions when the first body is slidably moved relative to the second body, a driving unit adapted to generate a driving force for rotating the camera and a housing adapted to rotatably Support the camera such that the camera and the driving unit are assembled as one body on the one of the first body and second body.

It is contemplated that the first body is adapted to slide down over the Second body to expose the second body and the camera assembly is positioned at an upper portion of the second body. It is further contemplated that the camera is rotated to face a front side of the second body when the second body is exposed and the camera is rotated to face a rear side of the second body when the second body is covered.

It is contemplated that the first body adapted to slide up over the second body to expose the second body and the camera assembly is positioned at an upper portion of the first body. It is further contemplated that the camera is rotated to face a rear side of the first body when the second body is exposed and the camera is rotated to face a front side of the first body when the second body is covered.

It is contemplated that the camera is adapted to rotate according to manipulation of a button installed on at least one of the first body and the second body. It is further contemplated that the housing includes a first receiving portion adapted to provide a rotation space for the camera and a second receiving portion adapted to receive the driving unit.

It is contemplated that the first receiving portion includes openings in both forward and rearward directions, the openings adapted to allow a lens of the camera to be exposed according to a rotational position of the camera. It is further contemplated that the terminal further includes first and second shaft supports formed at the first receiving portion and adapted to rotatably support first and second shafts formed at opposite sides of the camera.

It is contemplated that the second receiving portion is connected to the first receiving portion. It is further contemplated that the terminal further includes a connection recess formed at an end of the first shaft of the camera and to which a rotational shaft of the driving unit is connected.

It is contemplated that the terminal further includes an abrasion-preventing member installed between the connection recess and the rotational shaft of the driving unit and adapted to prevent the connection recess from being abraded. It is further contemplated that the terminal further includes a rotation-limiting part formed between the first shaft of the camera and the driving unit and adapted to rotate the camera at a certain rotation angle.

It is contemplated that the rotation-limiting part includes a rail recess formed as a groove in a circular arc shape on the first shaft and a stop protrusion formed at the housing and adapted to engage opposite ends of the rail recess. It is further contemplated that the terminal further includes buffering members formed at opposite ends of the rail recess and adapted to buffer an impact applied by the stop protrusion.

It is contemplated that the terminal further includes a flexible PCB provided at the second shaft and connecting the camera to a circuit board installed at the terminal body, the flexible PCB adapted to be wound or unwound when the camera is rotated. It is further contemplated that the terminal further includes a winding-limiting part formed at the second shaft and adapted to prevent an inner portion of the flexible PCB from being wound.

It is contemplated that the winding-limiting part includes a winding shaft adapted to allow an inner ring portion of the flexible PCB to be fixedly inserted in a loop state with a certain length and a fixing protrusion disposed at one side of the winding shaft such that a narrow gap is formed between the winding-limiting part and fixing protrusion. It is further contemplated that the driving unit includes a motor.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The present invention will be described with reference to the accompanying drawings. In an exemplary embodiment of the present invention, a slide type mobile communication terminal is taken as an example, but the present invention is also applicable to a bar type mobile communication terminal, a folder type mobile communication terminal or any other types of mobile communication terminals.

Figure 1:
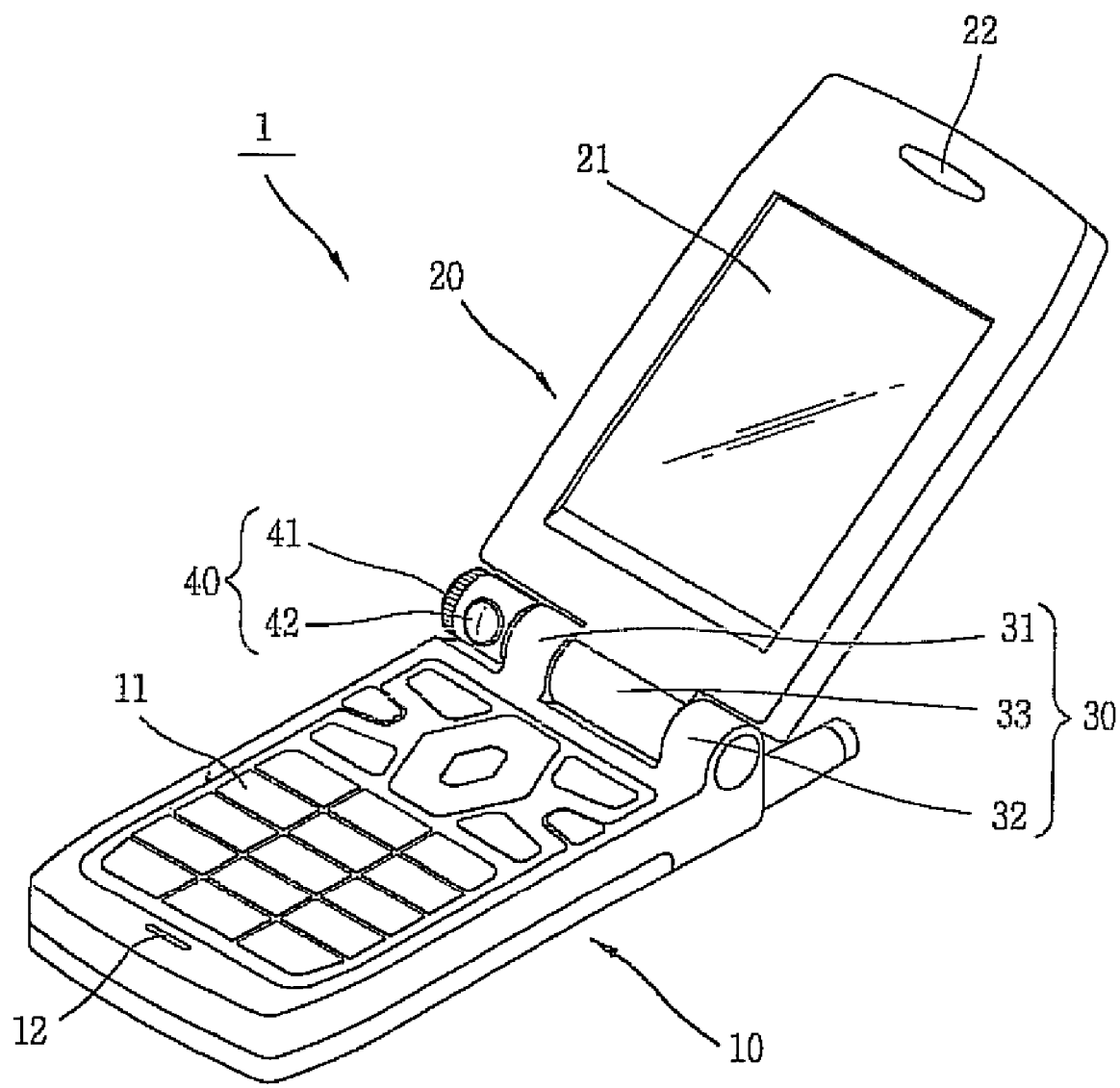
FIG. 1 is a perspective view of a conventional mobile communication terminal.
Figure 2:
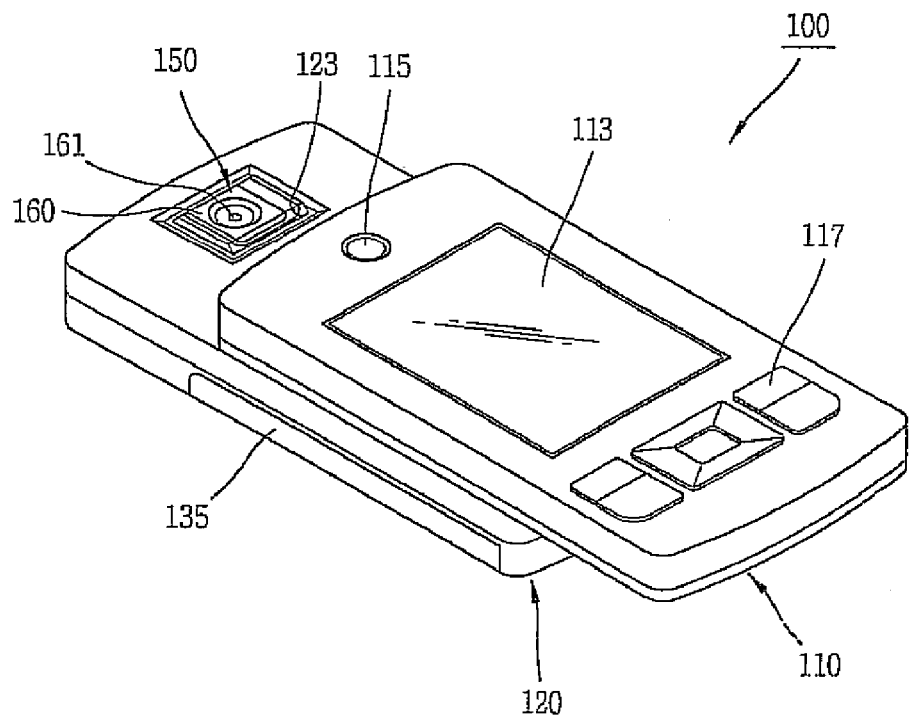
FIG. 2 is a front perspective view of a mobile communication terminal according to one embodiment of the present invention.

FIG. 2 is a perspective view of a mobile communication terminal 100 according to one embodiment of the present invention. As illustrated in FIG. 2, the mobile communication terminal 100 includes a first body 110, a second body 120 connected to a rear side of the first body such that it is slidably movable and a camera assembly 150 installed on the second body and exposed in both the forward and rearward directions when the first body is slidably moved over the second body.

The first body 110 is slid over the second body 120 in order to open the mobile communication terminal 100. The camera assembly 150 is positioned at an upper portion of the second body 120.

A camera 160 is installed inside the camera assembly 150. When the second body 120 is opened with respect to the first body 110, the camera 160 is rotated to face an opening 123 formed on a front side of the second body and when the second body 120 is closed with respect to the first body 110, the camera 160 is rotated to face an opening 133 formed on a rear side of the second body.

A display 113 for displaying visual information, a keypad 117 for entering a control signal and a speaker 115 for outputting a voice signal may be included on the front surface of the first body 110. A battery 135 for supplying power to the terminal 100 may be mounted on the rear surface of the second body 120.

The camera assembly 150 is disposed at the upper portion of the second body 120. As illustrated in FIG. 2, when the second body is exposed by moving the first body 110 downward over the second body, the camera assembly 150 is exposed through the opening 123 of the front surface of the second body.

Figure 3:
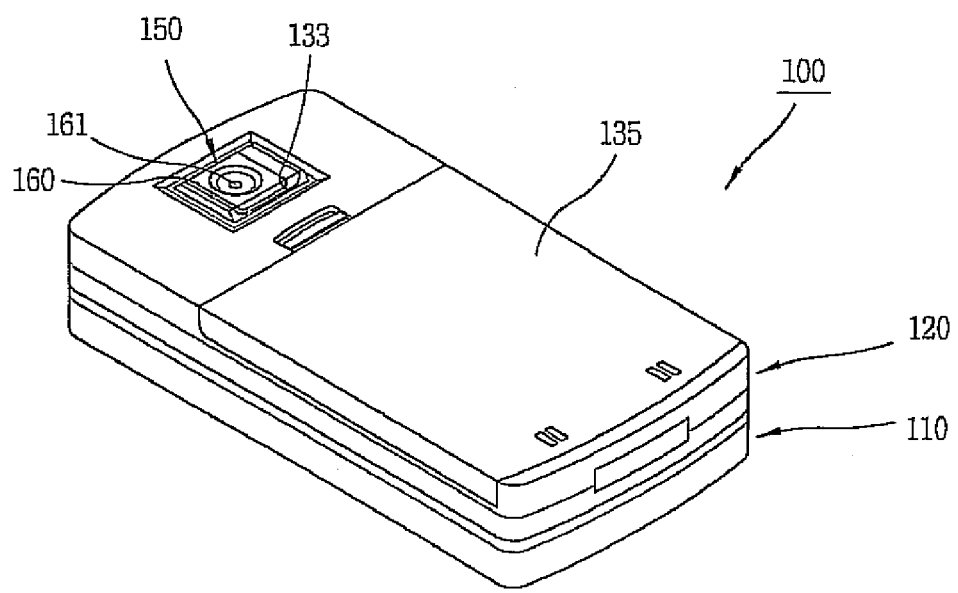
FIG. 3 is a rear perspective view of the mobile communication terminal illustrated in FIG. 2 showing a camera of a camera assembly terminal disposed to face the rear side of the mobile communication terminal.

FIG. 3 is a rear perspective view showing the camera 160 of the camera assembly 150 disposed to face the rear side of the mobile communication terminal 100 illustrated in FIG. 2. As illustrated in FIG. 3, when the first body 110 is slidably moved upward over the camera assembly 150, the camera lens 161 inside the camera assembly is also rotated such that the camera lens is positioned at the side of the opening 133 formed at the rear surface of the second body 120.

Figure 4:
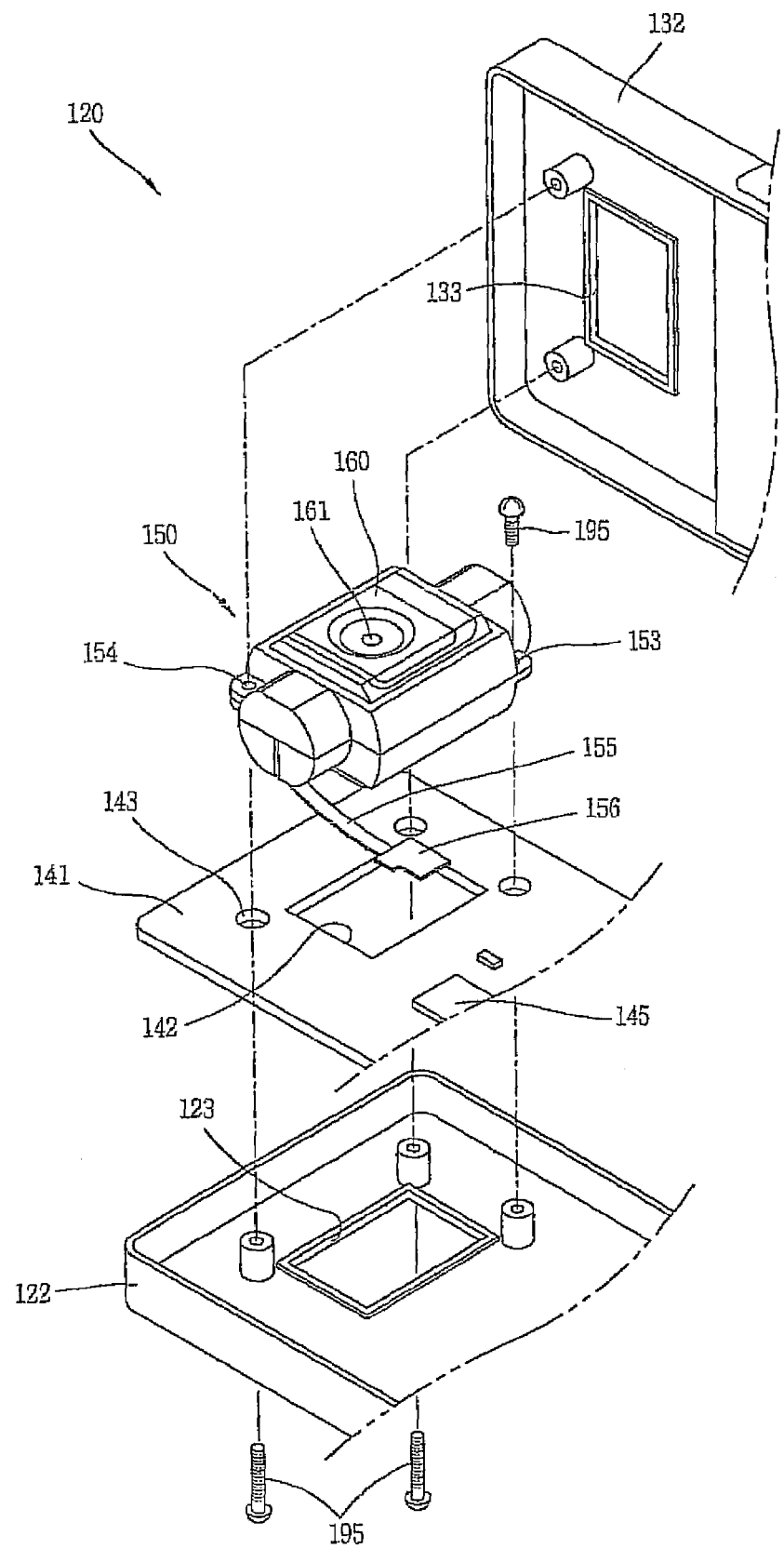
FIG. 4 is an exploded perspective view of a camera assembly region of the mobile communication terminal illustrated in FIG. 2.

FIG. 4 is an exploded perspective view of a camera assembly region of the second body 120 illustrated in FIG. 2. As illustrated in FIG. 4, the second body 120 includes a front case 122 and a rear case 132, each having openings 123, 133 and are assembled such that the lens 161 of the camera assembly 150 can be exposed.

A circuit board 141 having an opening 142 performs various functions of the mobile communication terminal and is installed between the front case 122 and rear case 132. A plurality of fastening holes 143 for fastening the camera assembly 150 are formed around the opening 142.

An extra fixing fastening hole 153 can be formed at one portion of the camera assembly 150 to allow the camera assembly to be fastened to the front case 122 before the rear case 132 is fixed to the front case. A fastening hole 154 is formed at another portion of the camera assembly 150 for fastening the camera assembly together with the front case 122 and the rear case 132. Accordingly, because the camera assembly 150 is fastened at several locations, the camera assembly can be firmly supported and assembly is simple.

A flexible printed circuit board (PCB) 155 is provided at one side of the camera assembly 150 in order to electrically connect the camera assembly to the circuit board 141. Connectors 156, 145 are provided at an end of the flexible PCB 155 and at the circuit board 141 for connecting the circuit board 155.

Figure 5:
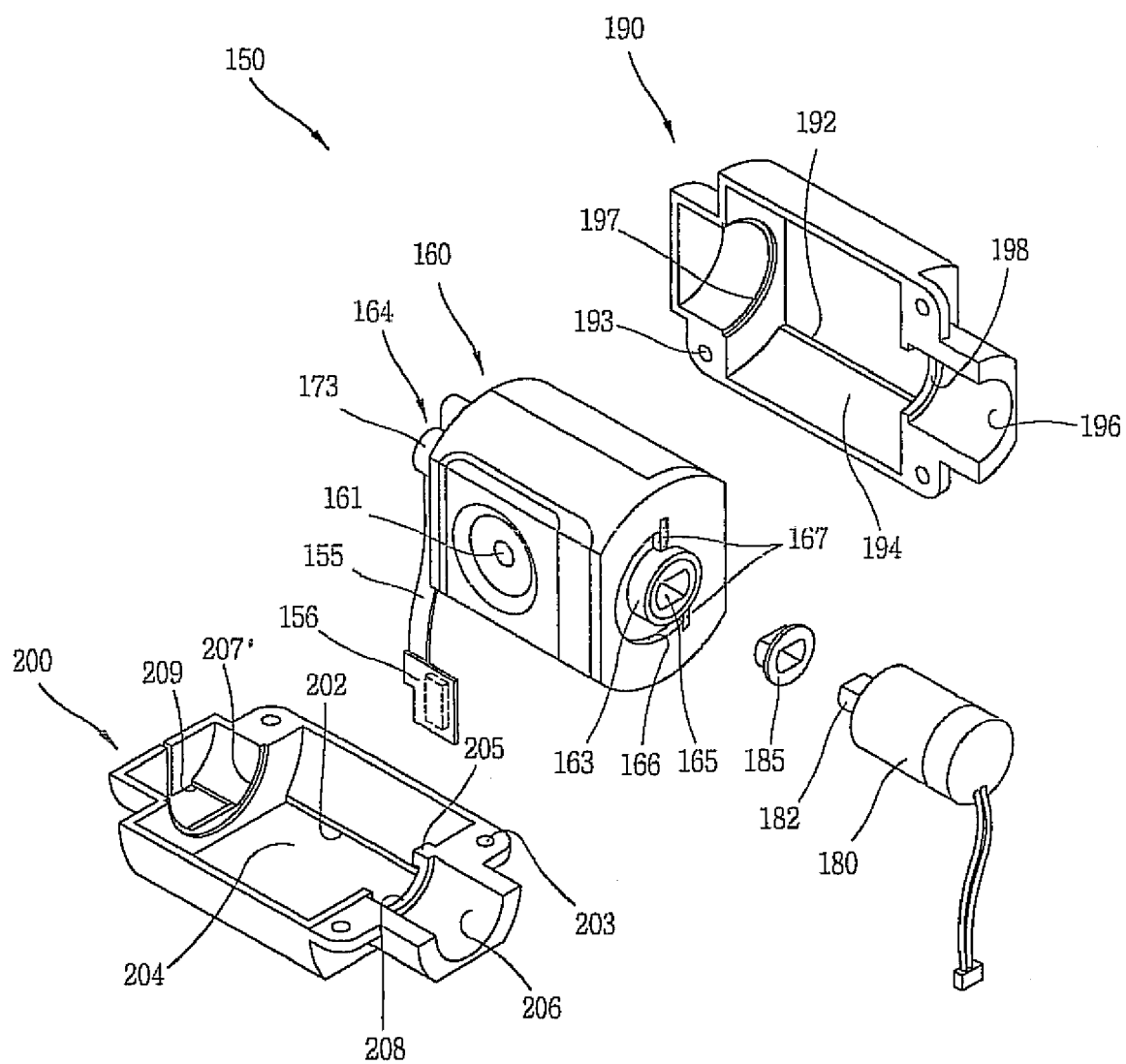
FIG. 5 is an exploded perspective view of the camera assembly illustrated in FIG. 4.

FIG. 5 is an exploded perspective view of the camera assembly 150 illustrated in FIG. 4. As illustrated in FIG. 5, the camera assembly 150 includes a camera 160, a driving unit 180 for generating a driving force to the camera and a first housing 190 and second housing 200 for rotatably supporting the camera therein, fixing the camera and driving unit as one assembled body and engaging the second body 120.

The first and second housings 190, 200 partially include first receiving parts 192, 204 for providing a rotation space for the camera 160 and second receiving parts 196, 206 for receiving the driving unit 180. Since the camera 160 and the driving unit 180 are assembled and fixed when the first and second housings 190, 200 are fixed, other fixing units that would otherwise be required for stably mounting the camera and the driving unit are not necessary, such as the basic moving factors. The first receiving parts 194, 204 have openings 192, 202 in both forward and rearward directions to allow the camera lens 161 to be exposed according to its rotation angle.

The camera 160 includes a first shaft 163 and a second shaft 164. The first shaft 163 is formed at one end of the camera 160 and receives power from the driving unit 180. The second shaft 164 is formed at the other end of the camera 160 and rotatably supports the camera at the housings 190, 200.

First shaft supports 198, 208 and second shaft supports 197, 207 that rotatably support the first shaft 163 and second shaft 164 are formed at both ends of the first receiving parts 194, 204. The second receiving parts 196, 206 are connected with the first receiving parts 194, 204 by the first shaft supports 198, 208.

The driving unit 180 is fixedly received in the second receiving parts 196, 206 and is preferably disposed in the same direction as the first shaft 163 and second shaft 164 in order to allow components required for transferring power to be omitted. The driving unit 180 can be a motor operated by electricity, such as a geared motor, whose rotation can be decelerated.

A connection recess 165 is formed at an end of the first shaft 163. A rotational shaft 182 of the driving unit 180 can be inserted into the connection recess 165 in order to transfer power.

An abrasion-preventing member 185 is installed between the connection recess 165 and the rotational shaft 182 of the driving unit 180 to prevent abrasion or deformation of the connection recess 165 and accurately transfer power. The abrasion-preventing member 185 prevents the generation of a gap between the connection recess 165 and the rotational shaft 182 due to an impact when the rotation of the rotational shaft 182 of the driving unit 180 is changed such that reliability is not degraded.

Figure 6:
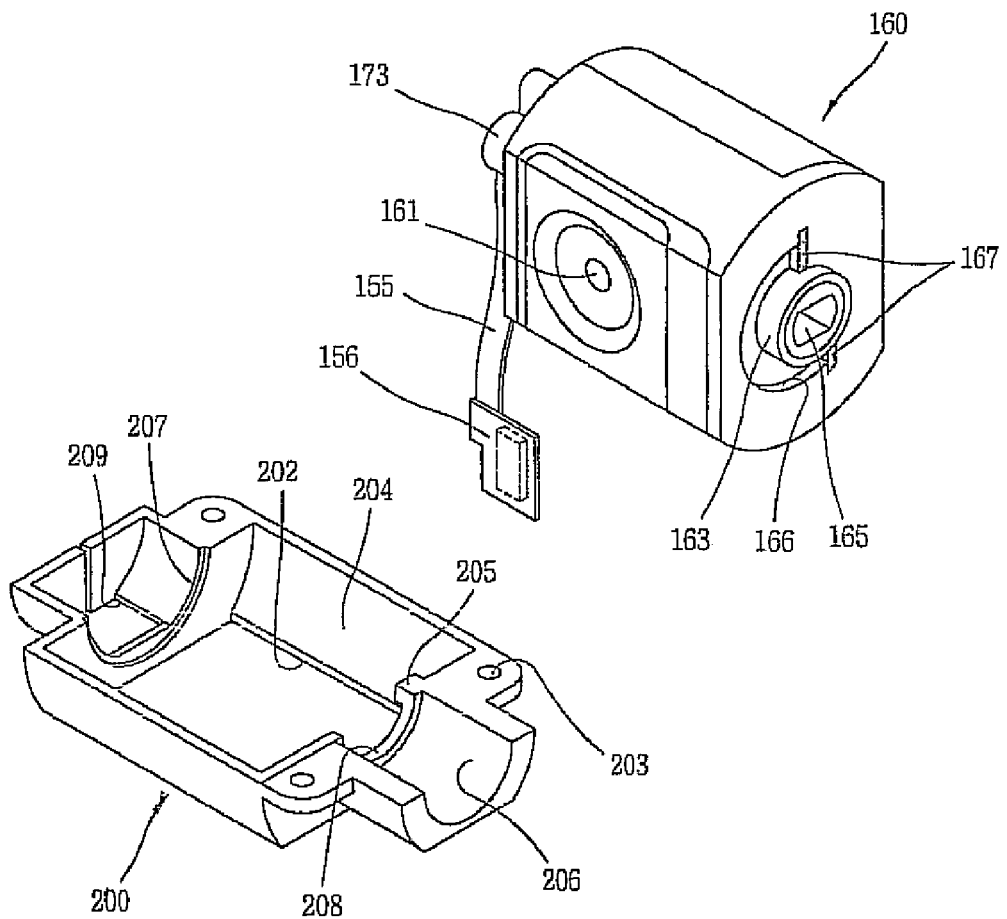
FIG. 6 is a perspective view of a rotation-limiting unit of the camera illustrated in FIG. 5.
Figure 7:
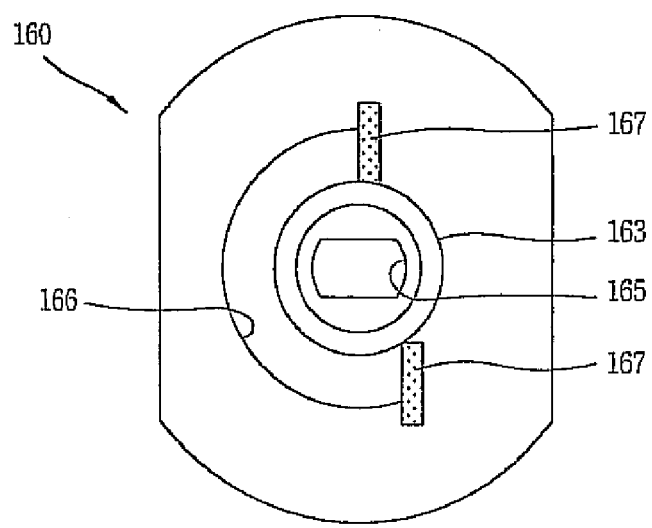
FIG. 7 is a side view of the housing of the mobile communication terminal in FIG. 6.

FIG. 6 is a perspective view of the rotation-limiting unit of the camera illustrated in FIG. 5, and FIG. 7 is a side view of a housing. As illustrated in FIGS. 6 and 7, a rotation-limiting part is formed between the first shaft 163 of the camera 160 and the driving unit 180.

The rotation-limiting part includes a rail recess 166 formed as a groove in a circular arc shape on the first shaft 163 and a stop protrusion 205 formed at the second housing 200, which functions to engage opposite ends of the rail recess 166. Accordingly, the rotation angle of the camera 160 is limited by the length of the rail recess 166 such that when the stop protrusion 205 engages either end of the rail recess 166, the rotation of the camera 160 is stopped.

Preferably, buffering members 167 are formed at opposing ends of the rail recess 166 in order to buffer an impact with the stop protrusion 205. Because the camera 160 is mechanically rotated by the driving unit 180, the buffering members 167 can serve to buffer the impact generated when the stop protrusion 205 engages the rail access 166, thereby preventing damage to the camera 180. The buffering members 167 can be made of an elastic member such as rubber or silicon rubber.

Figure 8:
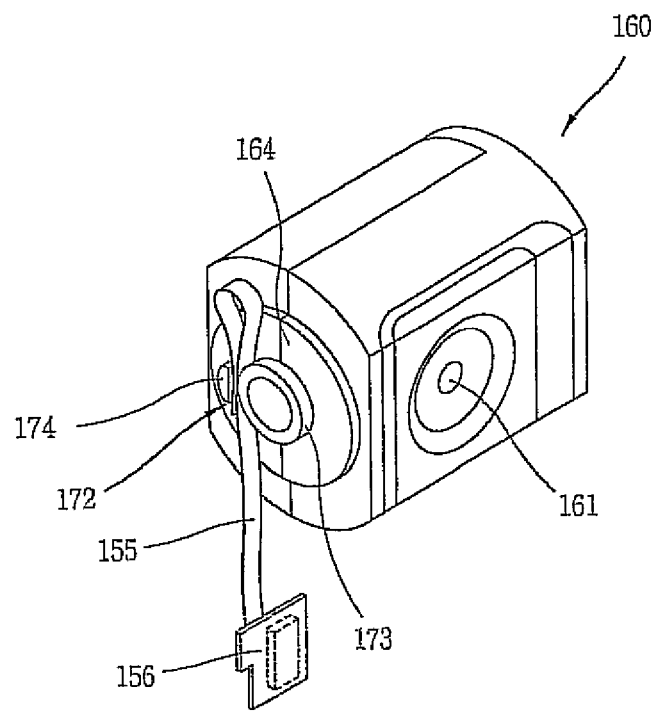
FIG. 8 is a side perspective view of a second shaft of the housing illustrated in FIG. 7.
Figure 9:
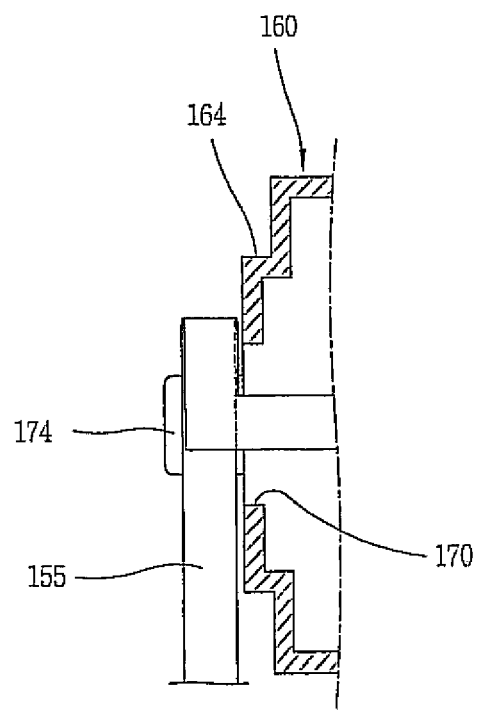
FIG. 9 is a sectional view of the second shaft of the housing illustrated in FIG. 8.

FIG. 8 is a side perspective view of a second shaft of the housing illustrated in FIG. 7. FIG. 9 is a sectional view of the second shaft of the illustrated housing in FIG. 8.

As illustrated in FIG. 8, the flexible PCB 155 is provided at the second shaft 164 of the camera 160 to facilitate connection of the camera 160 to the circuit board 141. The flexible PCB 155 is wound or unwound according to the rotation of the camera 160.

As illustrated in FIG. 9, the flexible PCB 155 is installed such that it extends out through a hole 170 formed at the central portion of the camera 160, overlaps itself by 90° and is then is wound according to the rotation of the camera 160. The flexible PCB 155 is drawn out through the opening 209 formed in the first and second housings 190, 200.

A winding-limiting part 172 is formed at the second shaft 164 to prevent an inner portion of the flexible PCB 155 from being wound. The winding-limiting part 172 includes a winding shaft 173 to allow an inner ring portion of the flexible PCB 155 to be fixedly inserted in a loop state with a certain length and a fixing protrusion 174 disposed at one side of the winding shaft 173 such that a narrow gap is formed between the fixing protrusion and windows shaft. Specifically, the flexible PCB 155 extends from the hole 170 is fixed by the winding-limiting part 172 and then wound or unwound along the winding shaft 173 according to a rotation of the second shaft 164.

With reference to FIG. 3, when a user desires to capture a photo or video of a subject positioned at a rear side of the second body 120, the lens 161 of the camera 160 is exposed through the opening 133 of the rear side of the second body. The user may manipulate the keypad 117 while looking at an image displayed on the display 113 in order to adjust a focal point of the subject to capture the image.

With reference to FIG. 2, if the user desires to capture an image of a subject positioned at the front side of the second body 120, including a self image, the first body 110 is slidably moved downward over the second body and the lens 161 of the camera 160 is exposed through the opening 123 of the front side of the second body. The user can appropriately manipulate the keypad 117 to focus while looking at an image displayed on the display 113 in order to capture the image.

Since the camera 160 is automatically rotated in the forward or rearward direction by the driving unit 180 without the necessity of manual rotation by the user, convenience can be increased. The rotation of the camera 160 can be performed using the keypad 117 installed at the first body 110.

In the present invention, the first and second housings 190, 200 rotatably support and fix the camera 160 to be the driving unit 180 such that the camera and the driving unit are assembled as one body. Furthermore, the camera 160 and driving unit 180 engage the second body 120 such that the camera and the driving unit are stably supported within the first and second housings 190, 200 and can be easily mounted. Moreover, the rotation angle of the camera 160 can be precisely limited by the rotation angle limiting part and damage to the camera can be prevented by the buffering member 167. The abrasion-preventing member 185 prevents the connection recess 165 from being abraded when the shaft 182 is rotated and transfers a precise rotating force to the shaft.

Additionally, because the inner portion of the flexible PCB 155 can be fixedly inserted in a loop state with a certain length by the winding-limiting part 172 installed on the second shaft 164, generation of a crack can be prevented. Furthermore, interference between the inner and outer portions of the flexible PCB 155 can be also prevented even though the flexible PCB 155 is repeatedly rotated about the point where the proceeding direction of the flexible PCB is changed by 90°.

Figure 10:
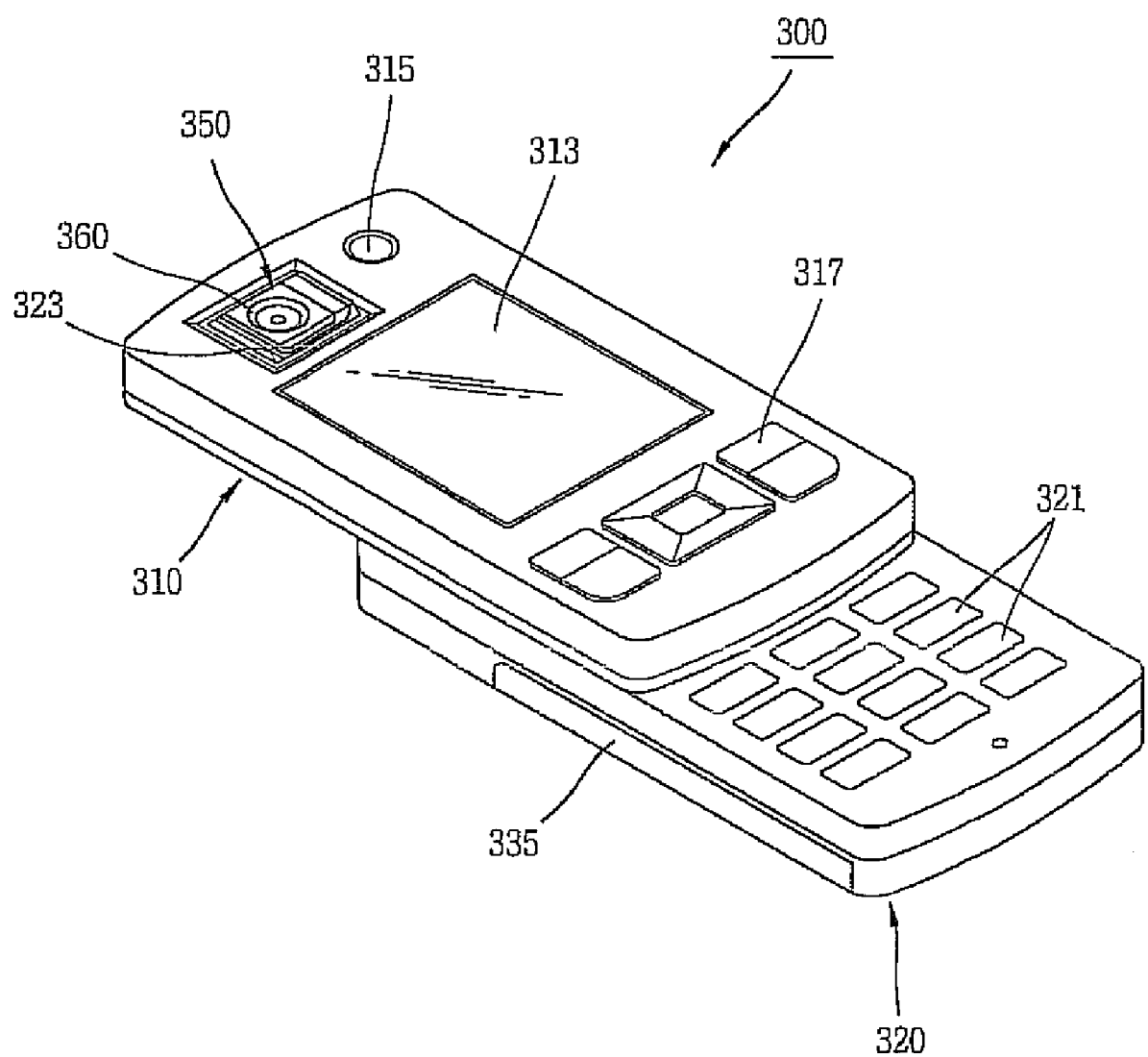
FIG. 10 is a perspective view of a mobile communication terminal according to another embodiment of the present invention.

FIG. 10 is a perspective view of a mobile communication terminal 300 according to another embodiment of the present invention, As illustrated in FIG. 10, the mobile communication terminal 300 includes a first body 310 that may be slid up over a second body 320 in order to expose the second body. A camera assembly 350 is positioned at an upper portion of the first body 310. The construction of the camera assembly 350 is similar to the camera assembly 150 of the first embodiment of the present invention, so a detailed description will be omitted.

When the second body 320 is exposed, a camera 360 is rotated to face the rear side of the first body 310 and when the second body is covered, the camera is rotated to face a front side of the first body. The rotation of the camera 360 can be accomplished using a keypad 317 installed at the first body 310.

Figure 11:
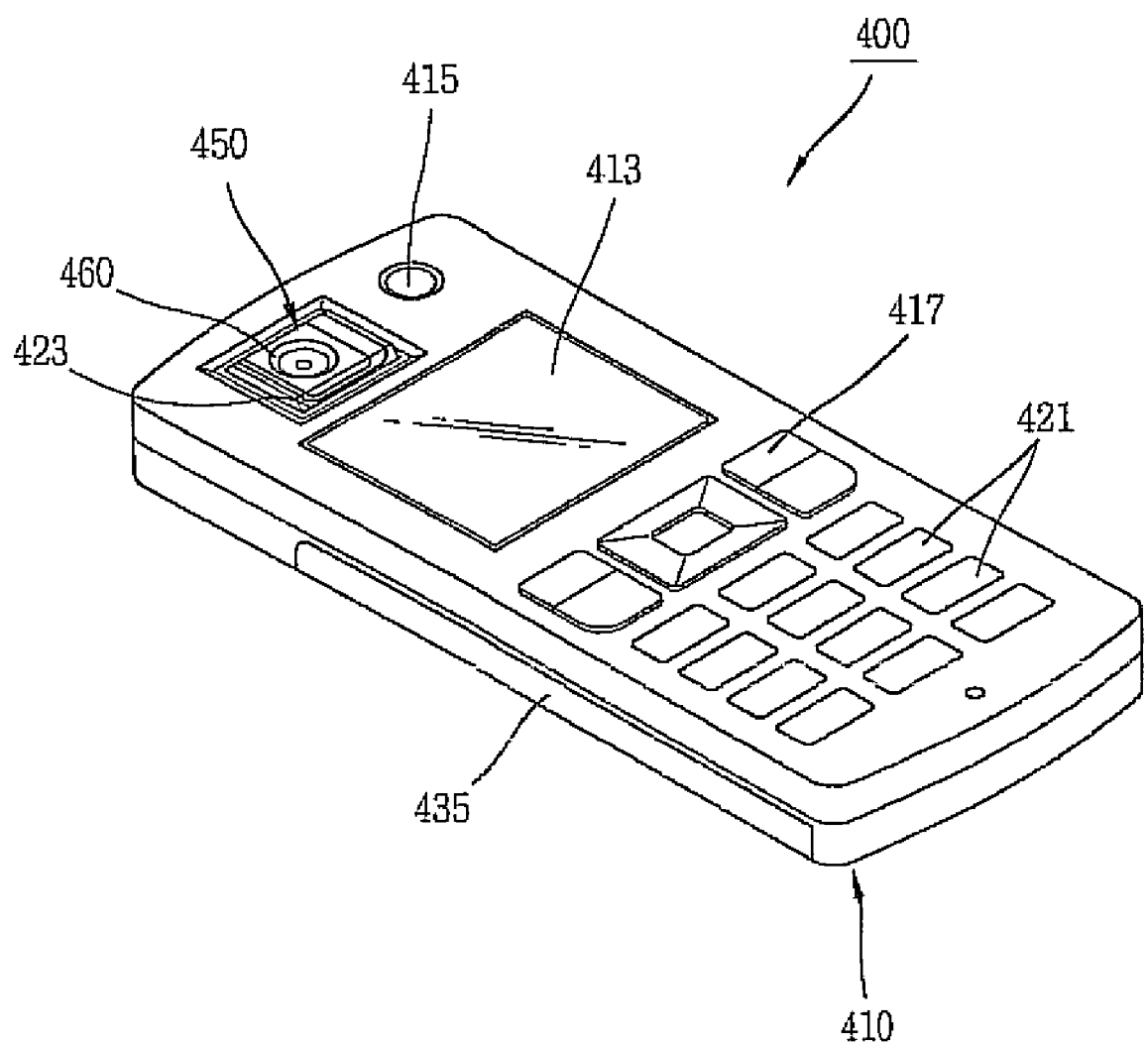
FIG. 11 is a perspective view of a mobile communication terminal according to another embodiment of the present invention.

FIG. 11 is a perspective view of a mobile communication terminal 410 according to another embodiment of the present invention. As illustrated in FIG. 11, the mobile communication terminal 400 is a bar-type mobile communication terminal constructed such that a camera assembly 450 is installed to face both the forward and rearward directions of a terminal body 410. The camera 460 can be rotated by manipulating key buttons 417, 421 installed on the terminal body 410.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile communication terminal, comprising:
   a first body;
   a second body connected at a rear side of the first body such that the first body may be slidably moved relative to the second body; and
   a camera assembly mounted on one of the first body and second body,
   wherein the first body is adapted to slide down over the second body to expose the second body and the camera assembly is positioned at an upper portion of the second body, wherein the camera assembly comprises:
      a camera configured to be rotated to face a front side of the second body when the second body is exposed, and configured to be rotated to face a rear side of the second body when the second body is covered;
      a driving unit configured to rotate the camera; and
      a camera housing coupled to at least the first body or the second body, the housing being sized to define a cavity within which the camera is rotatably positionable via the driving unit, wherein the camera housing comprises:
         a first receiving portion which defines the cavity; and
         a second receiving portion adapted to receive the driving unit, wherein the first receiving portion comprises openings in both forward and rearward directions, the openings adapted to allow a lens of the camera to be exposed according to a rotational position of the camera.

2. The terminal of claim 1, wherein the first body adapted to slide up over the second body to expose the second body and the camera assembly is positioned at an upper portion of the first body.

3. The terminal of claim 1, wherein the camera is rotated to face a rear side of the first body when the second body is exposed and the camera is rotated to face a front side of the first body when the second body is covered.

4. The terminal of claim 1, wherein the camera is adapted to rotate according to manipulation of a button installed on at least one of the first body and the second body.

5. The terminal of claim 1, further comprising first and second shaft supports formed at the first receiving portion and adapted to rotatably support first and second shafts formed at opposite sides of the camera.

6. The terminal of claim 5, wherein the second receiving portion is connected to the first receiving portion.

7. The terminal of claim 5, further comprising a connection recess formed at an end of the first shaft of the camera and to which a rotational shaft of the driving unit is connected.

8. The terminal of claim 5, further comprising a rotation-limiting part formed between the first shaft of the camera and the driving unit and adapted to rotate the camera at a certain rotation angle.

9. The terminal of claim 8, wherein the rotation-limiting part comprises:
a rail recess formed as a groove in a circular arc shape on the first shaft; and
a stop protrusion formed at the housing and adapted to engage opposite ends of the rail recess.

10. The terminal of claim 9, further comprising buffering members formed at opposite ends of the rail recess and adapted to buffer an impact applied by the stop protrusion.

11. The terminal of claim 9, wherein the driving unit comprises a motor.

12. The terminal of claim 5, further comprises a flexible PCB provided at the second shaft and connecting the camera to a circuit board installed at the terminal body, the flexible PCB adapted to be wound or unwound when the camera is rotated.

13. A mobile communication terminal, comprising:
a first body;
a second body connected at a rear side of the first body such that the first body is slidably moveable relative to the second body; and
a camera assembly mounted on one of the first body and second body, wherein the camera assembly comprises:
a camera comprising first and second shafts formed at opposite sides thereof;
a driving unit configured to rotate the camera;
a camera housing coupled to at least the first body or the second body, the housing being sized to define a cavity within which the camera is rotatably positionable via the driving unit, and the camera housing comprising a first receiving portion which defines the cavity and a second receiving portion configured to receive the driving unit;
first and second shaft supports formed at opposite ends of the first receiving portion and configured to rotatably support first and second shafts;
a connection recess formed at an end of the first shaft of the camera and to which a rotational shaft of the driving unit is connected; and
an abrasion-preventing member installed between the connection recess and the rotational shaft of the driving unit and configured to prevent the connection recess from being abraded.

14. A mobile communication terminal, comprising:
a first body;
a second body connected at a rear side of the first body such that the first body is slidably moveable relative to the second body; and
a camera assembly mounted on one of the first body and second body, wherein the camera assembly comprises:
a camera comprising first and second shafts formed at opposite sides thereof;
a driving unit configured to rotate the camera;
a camera housing coupled to at least the first body or the second body, the housing being sized to define a cavity within which the camera is rotatably positionable via the driving unit, and the camera housing comprising a first receiving portion which defines the cavity, and a second receiving portion configured to receive the driving unit;
first and second shaft supports formed at opposite ends of the first receiving portion and configured to rotatably support first and second shafts;
a connection recess formed at an end of the first shaft of the camera and to which a rotational shaft of the driving unit is connected;
a flexible printed circuit board (PCB) provided at the second shaft and connecting the camera to a circuit board installed at the terminal body, the flexible PCB configured to be wound or unwound when the camera is rotated; and
a winding-limiting part formed at the second shaft and configured to prevent an inner portion of the flexible PCB from being wound.

15. The terminal of claim 14, wherein the winding-limiting part comprises:
a winding shaft configured to allow an inner ring portion of the flexible PCB to be fixedly inserted in a loop state with a certain length; and
a fixing protrusion disposed at one side of the winding shaft such that a narrow gap is formed between the winding-limiting part and fixing protrusion.

* * * * *